US012139035B2

(12) United States Patent
Othman et al.

(10) Patent No.: US 12,139,035 B2
(45) Date of Patent: Nov. 12, 2024

(54) SYSTEM AND METHOD FOR CHARGING AN ELECTRIC VEHICLE

(71) Applicant: Caterpillar Inc., Peoria, IL (US)

(72) Inventors: Jeffery Othman, Naperville, IL (US);
Perry D. Converse, Lafayette, IN (US);
Michael A. Brewer, Metamora, IL (US); William E. Barnickel,
Washington, IL (US); Andrew J. Vitale, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 516 days.

(21) Appl. No.: 17/492,895

(22) Filed: Oct. 4, 2021

(65) Prior Publication Data
US 2023/0106720 A1 Apr. 6, 2023

(51) Int. Cl.
| | |
|---|---|
| *B60L 53/66* | (2019.01) |
| *B60L 50/60* | (2019.01) |
| *B60L 53/16* | (2019.01) |
| *B60L 53/30* | (2019.01) |
| *B60L 53/35* | (2019.01) |
| *B60L 53/36* | (2019.01) |

(Continued)

(52) U.S. Cl.
CPC ............. *B60L 53/66* (2019.02); *B60L 50/60* (2019.02); *B60L 53/16* (2019.02); *B60L 53/305* (2019.02); *B60L 53/35* (2019.02); *B60L 53/36* (2019.02); *B60L 53/62* (2019.02); *B60L 53/65* (2019.02); *B60L 53/67* (2019.02); *B60L 58/12* (2019.02); *H02J 7/0042* (2013.01); *H02J 7/0048* (2020.01)

(58) Field of Classification Search
CPC ...................................................... B60L 53/66
USPC .............................................................. 320/109
See application file for complete search history.

(56) References Cited

U.S. PATENT DOCUMENTS 8,294,420 B2 10/2012 Kocher
8,718,856 B2 5/2014 Leary
(Continued)

FOREIGN PATENT DOCUMENTS

| JP | 2010230615 A | 10/2010 |
|---|---|---|
| JP | 5334604 B2 | 11/2013 |
| KR | 101973389 B1 | 8/2019 |

OTHER PUBLICATIONS

Written Opinion and International Search Report for Int'l. Patent Appln. No. PCT/US2022/044873, mailed Jan. 16, 2023 (11 pgs).

*Primary Examiner* — Jerry D Robbins
(74) *Attorney, Agent, or Firm* — von Briesen & Roper, s.c.

(57) ABSTRACT

A system and method for charging a plug-in electric vehicle are disclosed. The system includes a plug-in electric vehicle having a frame, a rechargeable battery pack, a vehicle inlet, a positioning module, and a first communication module; and a battery charging station having a plurality of connectors, an actuation mechanism, and a second communication module. The battery charging station is in operative communication with the PEV, can anticipate an arrival of the PEV, and can ready a connector corresponding to the PEV's vehicle inlet type. The method includes monitoring one or more characterising parameters of a PEV, determining that the PEV needs charging, routing the PEV to a battery charging station, transmitting forecasting information and an identity of the PEV to the battery charging station, and charging the PEV at the battery charging station.

19 Claims, 6 Drawing Sheets

(51) Int. Cl.
*B60L 53/62* (2019.01)
*B60L 53/65* (2019.01)
*B60L 53/67* (2019.01)
*B60L 58/12* (2019.01)
*H02J 7/00* (2006.01)

(56) References Cited

U.S. PATENT DOCUMENTS

| | | |
|---|---|---|
| 9,545,854 B2 | 1/2017 | Daum |
| 10,112,497 B2 | 10/2018 | Saito |
| 2011/0291616 A1* | 12/2011 | Kim .......................... H02J 5/00 |
| | | 320/109 |
| 2015/0298565 A1 | 10/2015 | Iwamura |
| 2017/0327091 A1* | 11/2017 | Capizzo ................. B64U 80/86 |
| 2018/0189686 A1* | 7/2018 | Díaz ..................... B60L 53/305 |
| 2018/0212438 A1 | 7/2018 | Bouman |
| 2019/0058342 A1* | 2/2019 | Jones ......................... H02J 7/00 |
| 2019/0217716 A1 | 7/2019 | Yang et al. |
| 2020/0070679 A1 | 3/2020 | Wang et al. |
| 2020/0378784 A1 | 12/2020 | Katanoda |
| 2020/0412160 A1 | 12/2020 | Manzoor et al. |
| 2021/0001740 A1* | 1/2021 | Machida ................. B60L 53/37 |
| 2021/0074094 A1* | 3/2021 | Schumacher ........... B60L 53/14 |

* cited by examiner

SYSTEM AND METHOD FOR CHARGING AN ELECTRIC VEHICLE

TECHNICAL FIELD

The present disclosure generally relates to electric vehicles (EV) and, more specifically, to a system for managing EV charging at one or more battery charging stations.

BACKGROUND

A plug-in electric vehicle (PEV) is a category of EV that includes both battery electric vehicles (BEV) and plug-in hybrid electric vehicles (PHEV). The former (BEV) is exclusively powered by chemical energy stored in a rechargeable battery pack and employs one or more electric motors for propulsion. The latter (PHEV) may or may not include an electric motor, but utilizes both an internal combustion engine and a rechargeable battery pack as sources of power. PEVs may come in many forms, including but not limited to automobiles, buses, motorcycles, trucks, off-road vehicles, recreational vehicles (RVs), etc. More recently, a number of industries, including those in agricultural, construction, mining, and resource fields, have begun electrifying work machines to supplement or altogether replace traditionally fossil-fuel dependent prime movers. In such fields, PEVs may be found in the form of excavators, wheel loaders, large mining trucks, dump trucks, bulldozers, service vehicles, and many other types of work machine.

In both commercial and industrial embodiments, PEVs may be electrically charged from an external power source, often at a battery charging station. However, depending on the vehicle type, make, model, and yet other factors, a different connection standard may be required to connect the vehicle to the external source. Consequently, many battery charging stations may comprise a plurality of connectors, each of which may correspond to a different type of vehicle inlet. At commercial charging stations for road vehicles, it may be common for drivers to manually select and plug in the corresponding connector from among the plurality of available connectors.

In contrast to commercial road vehicles, industrial work machines may vary more drastically in size and form. Consequently, the vehicle inlets for such machines may not only vary in connection standard, but in placement height, depth, and orientation. The reader is invited to imagine, for example, the size difference between a large mining truck and a compact skid steer, both of which may occupy the same work site and share the same charging station.

For a charging station to accommodate and charge a number of disparate work machines, it may need to comprise a plurality of connectors and, further, be configurable to position and align each connector to its corresponding vehicle. Requiring an operator to manually select, align, and couple the connector to the vehicle inlet—such as the case with many commercial charging stations—may be laborious, time-consuming, and error-prone. In addition, waiting for the vehicle to arrive at the station before performing each of the above steps may increase overall charging times.

One example of prior art may be found in US Publication No. 2020/0378784 by Katanoda et al. and assigned to the Toyota Motor Corporation. Katanoda discloses a system for navigating an EV to a battery charging station, the system including a vehicle; a portable terminal (e.g. a smartphone); a remote server; and a charging station. When external charging of the vehicle becomes necessary, a user may operate the portable terminal or smartphone, which communicates with the remote server to receive and display the location of a plurality of charging stations that are near or convenient to the vehicle. In addition to position information, the user may also be provided with a maximum power output of each station.

Unfortunately, the system disclosed by Katanoda et al. fails to forecast an arrival of the vehicle to the charging station that is its destination. Selection and preparation of the corresponding connector is therefore delayed until the vehicle arrives. Moreover, upon arrival, the driver or operator is expected to manually locate and couple the corresponding connector and the vehicle inlet. While the above may be a mild inconvenience for commercial vehicles, it can represent a far greater disruption for work machines, which, as previously discussed, can vary greatly in connection standard and inlet placement.

Accordingly, there remains a need in the art for a system and method for charging a PEV, wherein a charging station can anticipate the arrival of the PEV. The charging station may be capable of preemptively and automatically readying the corresponding connector, such that an arriving EV can promptly begin charging, thereby decreasing overall charging times and improving ease of use.

SUMMARY OF THE DISCLOSURE

According to a first aspect of the present disclosure, a system for charging a PEV is disclose. The system comprises a PEV, including a frame, a locomotive device, a rechargeable battery pack, a vehicle inlet, a positioning module, and a first communication module. The system further comprises a battery charging station, including a plurality of connectors, each connector being configured to charge a different vehicle inlet type; an actuation mechanism configured to ready a connector for charging; and a second communication module. The PEV and the battery charging station are in operative communication. Furthermore, the battery charging station anticipates an arrival of the PEV and readies the connector corresponding to the PEV's vehicle inlet type.

According to a second aspect of the present disclosure, a method of managing a plurality of PEVs and at least one battery charging station is disclosed. The method comprises: monitoring one or more characterising parameters of each of the plurality of PEVs; determining that a PEV from among the plurality of PEVs needs charging; routing the PEV to the battery charging station; transmitting forecasting information and an identity of the PEV to the battery charging station; and charging the PEV at the battery charging station.

According to a third aspect of the present disclosure, a method of charging a PEV at a battery charging station is disclosed. The method comprises: planning to charge the PEV at the battery charging station; the PEV entering a charging zone of the battery charging station; the battery charging station verifying an identity of the PEV; coupling a corresponding connector to a vehicle inlet of the PEV; the battery charging station supplying power to the PEV; decoupling the corresponding connector from the vehicle inlet of the PEV; and the PEV exiting the charging zone.

These and other aspects and features of the present disclosure will be more readily understood after reading the following description in conjunction with the accompanying drawings.

DETAILED DESCRIPTION

For the purposes of this disclosure, a battery electric vehicle (BEV) is a vehicle which utilizes chemical energy stored in a rechargeable battery pack to power one or more electric motors that propel the vehicle. BEVs do not have internal combustion engines, fuel cells, or other sources of primary or secondary power.

For the purposes of this disclosure, a plug-in hybrid electric vehicle (PHEV) is a vehicle which utilizes both an internal combustion engine, and a rechargeable battery pack powering one or more electric motors, to propel the vehicle. Unlike plain hybrid vehicles, PHEVs are able to recharge their battery packs from an external power source, such as a battery charging station.

For the purposes of this disclosure, a plug-in electric vehicle (PEV) is a subset of EVs that includes both BEVs and PHEVs.

Figure 1:
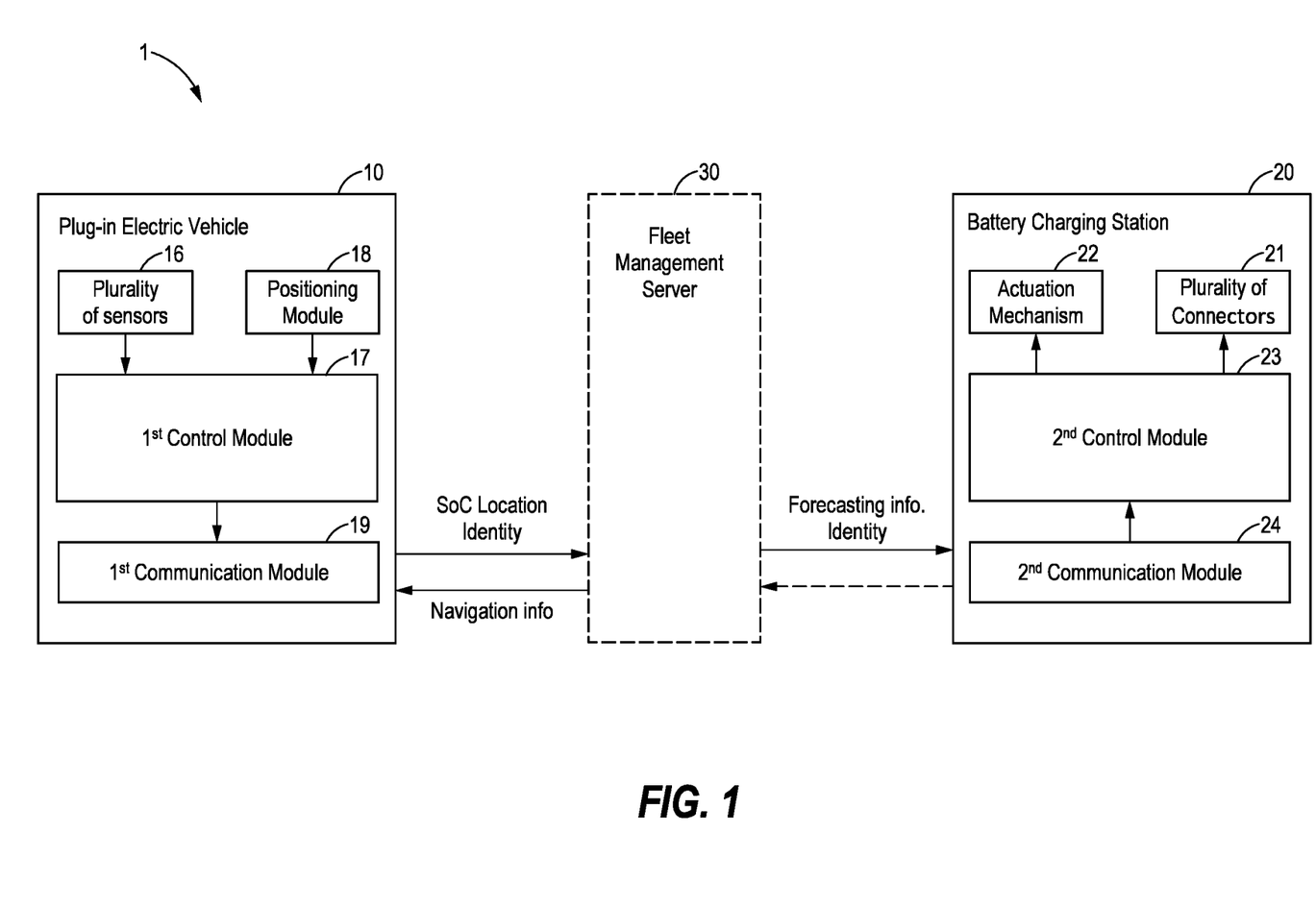
FIG. 1 is a diagram of a system for charging a PEV according to an embodiment of the present disclosure.

Referring now to the drawings and with specific reference to FIG. 1, a diagram of a system for charging a PEV is generally referred to by a reference numeral 1. The system 1 may comprise a PEV 10, a battery charging station 20, and, in some embodiments, a fleet management server 30.

In some embodiments, the PEV 10 may be a road vehicle, including but not limited to sedans, motorcycles, sports utility vehicles, coupes, light trucks, freight trucks, and the like. In other embodiments, the PEV 10 may be any work machine employed in an agricultural, construction, earth moving, mining, resource, or related industry, such as but not limited to large mining trucks, wheel loaders, bulldozers, motor graders, tractors, excavators, skid steers, and the like.

Figure 2:
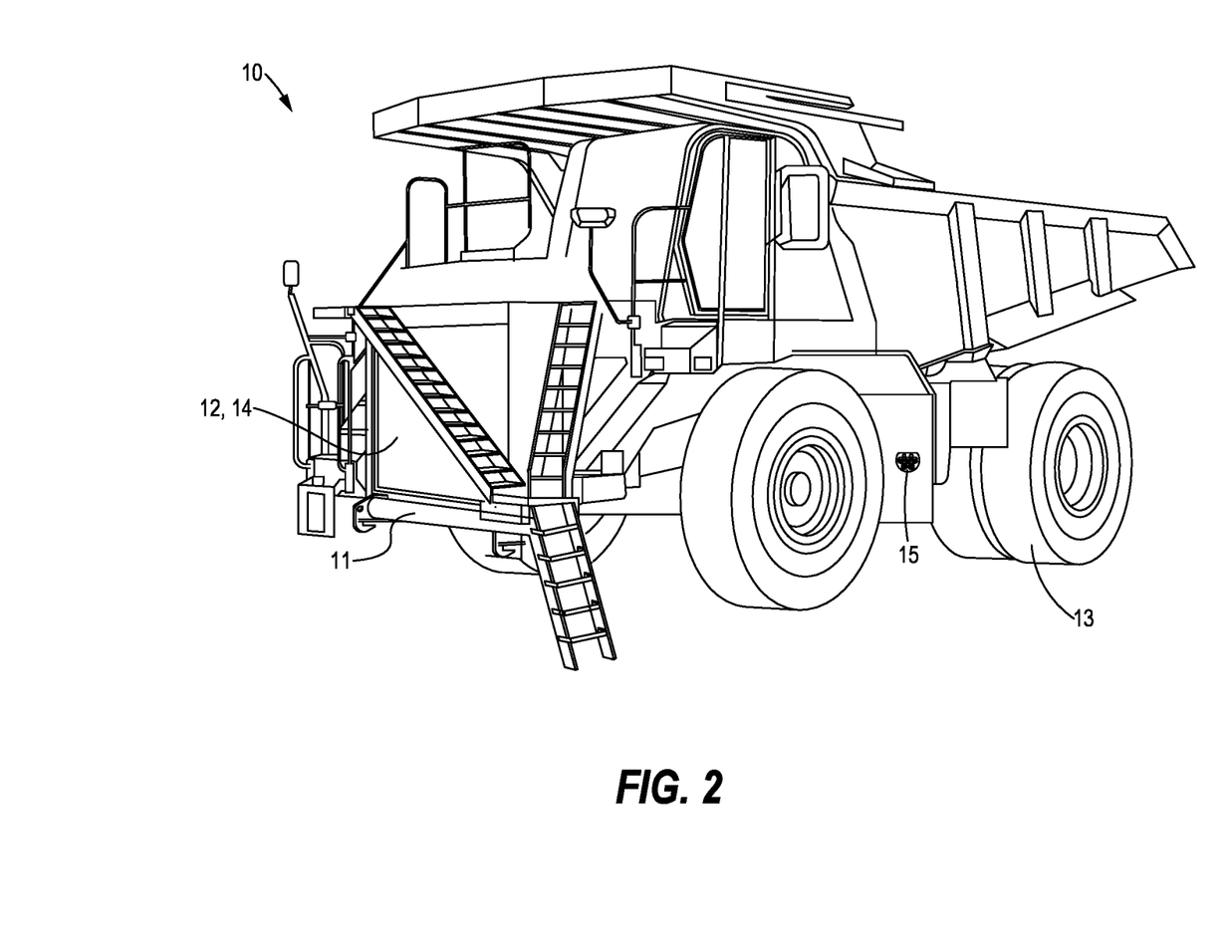
FIG. 2 is a perspective view of an exemplary PEV according to another embodiment of the present disclosure.

Turning to FIG. 2, an exemplary PEV 10 in the form of a large mining truck, or haul truck, is shown in greater detail. The PEV 10 may comprise a frame 11, an electric motor 12 supported by the frame 11, and a locomotive device 13 supporting the frame 11 and being operatively driven by the electric motor 12. The electric motor 12 may be powered by chemical energy stored in a rechargeable battery pack 14, and may or may not receive supplemental power from an internal combustion engine. No limitation is intended herein for the particular composition or topology of the rechargeable battery pack 14, which may be lead-acid, lithium-ion, nickel-metal hydride, etc. The locomotive device 13 may feature the wheels and tires as shown, or it may engage the ground in a separate fashion, such as by employing crawler belts, tracks, treads, and the like, in order to propel the PEV 10.

The PEV 10 may further comprise a vehicle inlet 15 or charging port that is operatively and electrically connected to the rechargeable battery pack 14 and designed to receive electrical power from an external source. In some embodiments, the vehicle inlet 15 may embody a common connector standard, such as SAE J1772, Type 2, GB/T, CCS1, among many others, and in other embodiments the vehicle inlet 15 may use a proprietary connection format unique to the type, make, or model of the PEV 10. It should be understood that, while the vehicle inlet 15 is shown to be located on a lower section of the frame 11, this is exemplary only, and the vehicle inlet 15 may be located elsewhere on the vehicle 10 without limitation. Notably, where the PEV 10 is a work machine, the placement and orientation of the vehicle inlet 15 may differ significantly across different vehicle types, makes, and/or models, which may themselves range in size and shape.

Returning now to FIG. 1, in some embodiments, the PEV 10 may further comprise a plurality of sensors 16 that measure one or more states of the rechargeable battery pack 14, including at least a total voltage, total current, and pack temperature. The sensors 16 may further measure the state of the battery pack 14 with finer granularity, such as by monitoring the voltage, current, and/or temperature of individual battery cells, battery groupings, battery modules, and yet other possible divisions. No limitation is intended herein for the type or number of electrical measurements performed by the plurality of sensors 16. Each measurement may be acquired by a first control module 17, such as a battery controller or an engine control unit (ECU), which determines and records one or more characterising parameters of the rechargeable battery pack 14. In particular, the characterising parameters may include at least a state of charge (SoC) or a depth of discharge (DoD) and a state of health (SoH) of the battery pack 14. In some embodiments, the first control module 17 may further determine additional characterising parameters, such as power flow, peak current, peak voltage, etc., where no limitation is intended herein. And in the same or other embodiments, the first control module 17 may be a controller, microcontroller, embedded PC, field-programmable gate array (FPGA), application-specific integrated circuit (ASIC), or comparable computing device, which may include a memory and a processor (not shown).

With continued reference to FIG. 1, the PEV 10 further comprises a positioning module 18 and a first communication module 19. The positioning module 18 may determine a position of the PEV 10 relative to a coordinate system and/or relative to the other components of the system 1. It may utilize a global positioning system, such as the eponymous Global Positioning System (GPS) or the global navigation satellite system (GNSS); or it may employ local positioning technologies, for example, those employing signal beacons, cell towers, magnetic positioning, Wi-Fi positioning, inertial sensing, and other techniques common to the art. In some embodiments, the positioning module 18 may be capable of locating the vehicle 10 with respect to maps, roads, motorways, routes, zones, etc., which may be stored on a memory of the positioning module 18, a memory of the first control module 17, or an external source.

The first communication module 19 may enable operative communication between the PEV 10 and the battery charging station 20 (specifically, a second communication module 24 of the battery charging station 20), such that the battery charging station 20 can anticipate an arrival of the vehicle 10. In various embodiments, this communication may or may not exist directly between the PEV 10 and the charging station 20; may be unidirectional or bidirectional; and may be implemented over any number of wireless communication protocols and technologies common to the art, such as but not limited to Wi-Fi, Bluetooth, cellular network, shortwave radio, and the like. In some embodiments, the PEV 10 and the charging station 20 may operatively communicate through an intermediary, such as the fleet management server 30, which will now be discussed in greater detail.

The fleet management server 30 may manage one or more PEVs 10 and one or more battery charging stations 20 comprising the system 1. Accordingly, it may engage in bidirectional communication with each PEV 10 via the first communication module 19, and in unidirectional or bidirectional communication with each battery charging station 20 via the second communication module 24.

The fleet management server 30 may receive and monitor the one or more characterising parameters of the PEV 10, such as the SoC, DoD, and/or SoH of its rechargeable battery pack 14, which may be operatively obtained from the plurality of sensors 16. The fleet management server 30 may further receive and monitor a location of the PEV 10, which may be operatively obtained from the positioning module 18.

If and when the PEV 10 needs recharging—a determination which may be reached, without limitation, by the first control module 17, the fleet management server 30, a human operator, or separate party altogether—the fleet management server 30 may route the PEV 10 to the battery charging station 20 by calculating and transmitting navigation information to the PEV 10. Furthermore, the fleet management server 30 may transmit forecasting information to the battery charging station 20, such as an ETA or distance to destination regarding the incoming vehicle 10. Lastly, the fleet management server 30 may transmit an identity of the incoming vehicle 10 to the battery charging station 20, which may include information describing its type, make, model, and/or serial number. Moreover, the identity of the vehicle 10 may inform the battery charging station of a vehicle inlet type, connection standard, current type, and any other charging requirements for the vehicle 10. By anticipating an arrival of the PEV 10, the battery charging station 20 can ready the corresponding connector 21(a) prior to the vehicle's arrival, thereby expediting the charging process.

In some embodiments, the system 1 may comprise a plurality of PEVs 10, each of which is in communication with the fleet management server 30 and in operative communication with the battery charging station 20. Accordingly, the fleet management server 30 may receive and monitor the characterising parameters, position, and identity of each PEV 10. In some embodiments, the fleet management server 30 may further queue one or more vehicles 10 for charging at a single battery charging station 20. The order of the queue may be based on a number of programmable factors, such as but not limited to the ETA of each vehicle 10, the operation schedule of each vehicle 10, and the vehicle inlet type of each vehicle 10.

In the same or other embodiments, the system 1 may comprise a plurality of battery charging stations 20, each of which is in communication with the fleet management server 30 and in operative communication with the one or more vehicles 10. In such cases, the fleet management server 30 may route each PEV 10 in need of charging to one of the plurality of battery charging stations 20. The choice of battery charging station 20 may be based on a number of programmable factors, such as but not limited to travel distance, travel time, travel hazards, and station availability.

Figure 3:
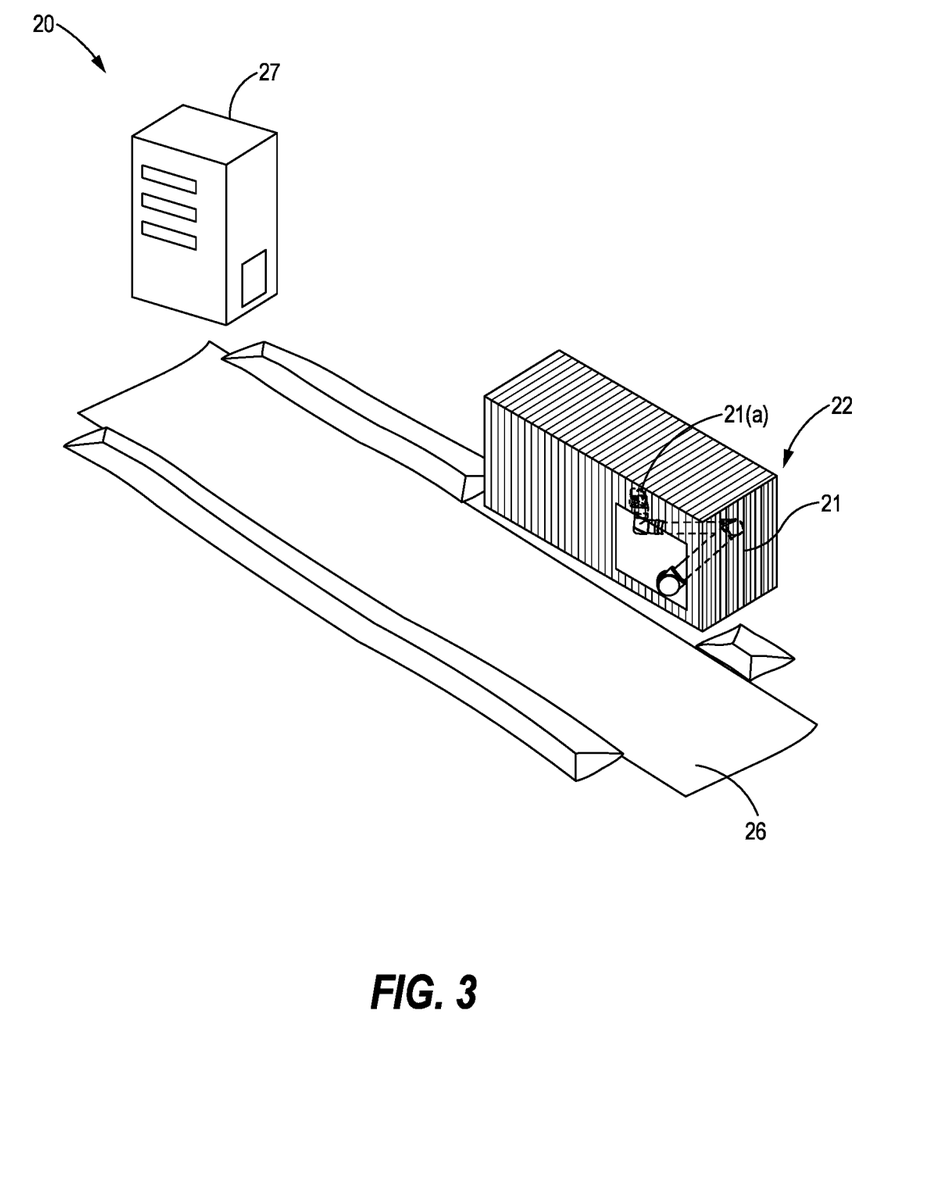
FIG. 3 is a perspective view of an exemplary battery charging station according to another embodiment of the present disclosure.

Turning now to FIG. 3, an exemplary battery charging station 20 is shown in greater detail. The charging station 20 may include a plurality of connectors 21 and an actuation mechanism 22. Each of the plurality of connectors 21 may be configured to interface with and charge a different vehicle inlet type. They may be limited to common connector standards and/or may include proprietary connection formats determined by specific applicational requirements. In some embodiments, the battery charging station 20 should include a corresponding connector 21(a) for each PEV 10 and vehicle inlet type in the system 1. And in other embodiments comprising a plurality of charging stations 20, there should exist at least one connector 21(a) among the plurality of stations 20 corresponding to each PEV 10 and each vehicle inlet type in the system 1.

Returning now to FIG. 1, the battery charging station 20 may further comprise a second control module 23 and a second communication module 24. The second control module 23 may be, without limitation, an embedded PC, gateway computer, microcontroller, FPGA, or similar device; and may operatively control the various electrical and mechanical processes associated with the plurality of connectors 21, the actuation mechanism 22, and general management of the battery charging station 20. The second control module 23 may include at least a memory and a processor (not shown).

In many embodiments, the second control module 23 may receive information and/or commands from the PEV 10 and/or from the fleet management server 30. The communication therein may be unidirectional, i.e. from the PEV 10 to the battery charging station 20 only, or may be bidirectional; and the communication may be direct, i.e. from the first communication module 19 to the second communication module 24; or may be via the fleet management server 30.

As previously discussed, the battery charging station 20 may receive forecasting information anticipating an arrival of a PEV 10. The forecasting information may include, for example, an ETA, estimated travel time, distance to destination, or similar metric. The battery charging station 20 may further receive an identity of the PEV 10, such as a vehicle type, model, or serial number. The identity of the PEV 10 may inform the charging station 20 of the vehicle's charging requirements, including the vehicle's inlet type, inlet location and orientation, voltage and current requirements, current output type, connection protocol, and any and all information relevant to coupling and supplying power to the PEV 10. This information may be stored on the memory of the second control module 23 and/or may be transmitted by the PEV 10 or the fleet management server 30.

The battery charging station 20 may ready a corresponding connector 21(a) for an incoming PEV 10 through the actuation mechanism 22, where the corresponding connector 21(a) is designed to interface with the vehicle inlet 15 of the PEV 10. In some embodiments, the actuation mechanism 22 may further adjust a position and an orientation of the connector 21(a) to properly align with that of the vehicle inlet 15, for example, by adjusting a height or an angle of entry. And in the same or other embodiments, the actuation mechanism 22 may be configured to automatically couple the connector 21(a) to the vehicle inlet 15. The above actions may be performed after the charging station 20 has received forecasting information, but before the arrival of the PEV 10. It may be understood, however, that some operations may require the vehicle 10 to be present, such as the coupling process itself. In yet other embodiments, the charging station 20 may further adjust an output voltage, output current, current type, and/or additional electrical characteristics of the charging power source, which may or may not be performed without the vehicle 10 present.

The actuation mechanism 22 may employ, without limitation, any number of designs, mechanisms, and tools to swap, ready, align, and/or couple the corresponding connector 21(a). For example, the plurality of connectors 21 may be controllably connected to a power source through a series of switches, contactors, relays, or the like; and the actuation mechanism 22 may route power to the corresponding connector 21(a). In another example, the actuation mechanism 22 may removably swap or install a corresponding connector 21(a) onto a primary charging cable (not shown). In some exemplary embodiments, the actuation mechanism 22 may perform some or all of the above actions through a robotic arm. For example, the robotic arm may be capable of readying a connector 21(a), exchanging one connector 21(a) for another, adjusting a position and an orientation of the readied connector 21(a), and/or automatically coupling the connector 21(a) to the vehicle inlet 15. Without limitation, the robotic arm may utilize cartesian, cylindrical, and/or polar coordinates; may or may not be articulated; may or may not be telescoping; may have two or more rotary joints; may offer five or more degrees of freedom; and yet other possibilities, depending on specific applicational requirements.

Returning now to FIG. 3, the battery charging station 20 may further comprise a charging zone 26 and a local verification module 27. The charging zone 26 may represent a bounded area of the station 20, wherein only one PEV 10 may enter at a time. In various embodiments, the charging zone 26 may be determined by physical barriers, such as through the use of a sliding gate, gate arm, one-way speed bump, and the like; or the bounds of the charging zone 26 may be determined by a wireless, software, and/or "invisible" means.

Regardless, upon entering the charging zone 26, the local verification module 27 may verify an identity of the PEV 10, for example by vehicle model or serial number. In certain embodiments where the charging station 20 has not received forecasting information on the PEV 10, the local verification module 27 may identify (instead of verify) the vehicle 10 instead. In such embodiments, the local verification module 27 may further receive the vehicle's charging requirements, including the inlet type, inlet placement and orientation, voltage and current requirements, current type, connection standard, connection protocol, etc. This information may be stored on a memory or database of the second control module 23 and accessed through keying the identity of the vehicle 10; or it may be transmitted directly by the PEV 10 or the fleet management server 30. In preferred embodiments, wherein the charging station 20 has received forecasting information, the verification module 27 may merely verify that the correct vehicle 10 has arrived. In such cases, the identity of the vehicle 10 may thus be confirmed twice, once through the forecasting information and once through local verification. The verification module 27 may utilize a number of known identification and/or verification technologies, such as RFID, barcode scanning, Bluetooth pairing, Wi-Fi handshake, etc., where no limitation is intended herein.

In some embodiments, the battery charging station 20 may lock the charging zone 26 after a proper identification and/or verification of the PEV 10, such that no other vehicles can enter. Where applicable, this may involve actuating the physical barriers to the charging zone 26, such as the gate, gate arm, speed bumps, etc.; or it may involve locking the zone 26 using wireless and/or software means. Likewise, the battery charging station 20 may unlock the charging zone 26 after the PEV 10 has finished recharging and exited the station, such that another PEV 10 can enter and repeat the process.

By employing the system 1 and methods presently disclosed, a PEV 10 may be routed to a battery charging station 20 and the charging station 20 forewarned of an arrival of the PEV 10. Subsequently, the charging station 20 may preemptively swap, align, adjust, and otherwise ready a corresponding connector 21(a) to interface with a vehicle inlet 15 of the PEV 10, thereby expediting and simplifying the charging process for an electric vehicle.

In some embodiments of the present disclosure, the PEV 10 may be a work machine employed in a natural resource or mining industry, such as a large mining truck, bulldozer, dump truck, excavator, conveyor, and the like.

Finally, in some embodiments, the battery charging station 20 may be stationary. In other embodiments, however, the battery charging station 20 may be a mobile charging station. In such embodiments, the charging station 20 may be capable of travelling to the location of the PEV 10 and/or the fleet management server 30 may arrange for the PEV 10 and the charging station 20 to meet at a third location.

INDUSTRIAL APPLICATION

The present application may find industrial applicability toward any number of PEVs and battery charging stations, and may be particularly useful toward PEVs in the form of work machines and their associated battery charging stations.

With respect to commercial EVs, the present disclosure may be applied to road vehicles, such as but not limited to sedans, vans, light trucks, freight trucks, motor cycles, RVs, off-road vehicles, etc. By employing the disclosed systems and methods, a PEV may be conveniently routed to a nearby battery charging station; and the battery charging station may anticipate an arrival of the vehicle. Consequently, the charging station may be able to, among other functions, allocate a physical lot, ready a corresponding connector, adjust a voltage output, adjust a current type etc., in order to expedite the charging process for the driver.

The present disclosure may be particularly advantageous toward electric work machines, which can vary more drastically in connection standard, vehicle inlet type and placement, and charging requirements. Manually charging such vehicles, i.e. selecting, readying, aligning, and coupling the corresponding connector, may demand greater effort from an operator as compared to a commercial vehicle. Moreover, substantial time may be wasted if the process does not begin until the vehicle arrives, which can decrease an operating efficiency of both the vehicle and the charging station.

By incorporating the present systems and methods, a work machine may be notified when charging is needed, conveniently routed to a nearby charging station, and efficiently charged therein. Likewise, a battery charging station may anticipate an arrival of the EV, ready the corresponding connector, position and align the connector, adjust current and voltage outputs, and, in some embodiments, automatically couple the connector, thereby expediting the charging process and minimizing user effort and error.

The present disclosure may be applied toward a plurality of work machines and/or a plurality of battery charging stations. For example, the present application may be applied to a fleet of industrial vehicles, such as those associated with a particular work site or operation. The plurality of vehicles may be in an agricultural environment, such as a ranch, feedlot, plantation, orchard, etc.; a construction environment, such as a demolition zone, road construction work zone, building site, construction site for railways, tunnels, bridges, drainage systems, pipelines, etc.; a mining environment, such as an open-pit mine, quarry, highwall mine, long wall mine; and yet other possibilities. The vehicles employed therein may include, without limitation, tractors, crop sprayers, balers, combine harvesters, bulldozers, trenchers, graders, backhoes, scrapers, excavators, mining trucks, rope shovels, dump trucks, and many others.

Further, the present disclosure may be integrated with existing fleet management systems, such as Caterpillar® MineStar™ solutions, to further improve vehicle charging processes alongside existing fleet management functionality. When incorporated with a fleet management system, the present disclosure may enable a plurality of vehicles to be efficiently queued at a single battery charging station, or a single vehicle to be algorithmically routed to one of a plurality of charging stations.

Finally, the present disclosure may be particularly applicable toward autonomous or semiautonomous vehicles by enabling yet additional automated processes, i.e. autonomous or semiautonomous charging.

Figure 4:
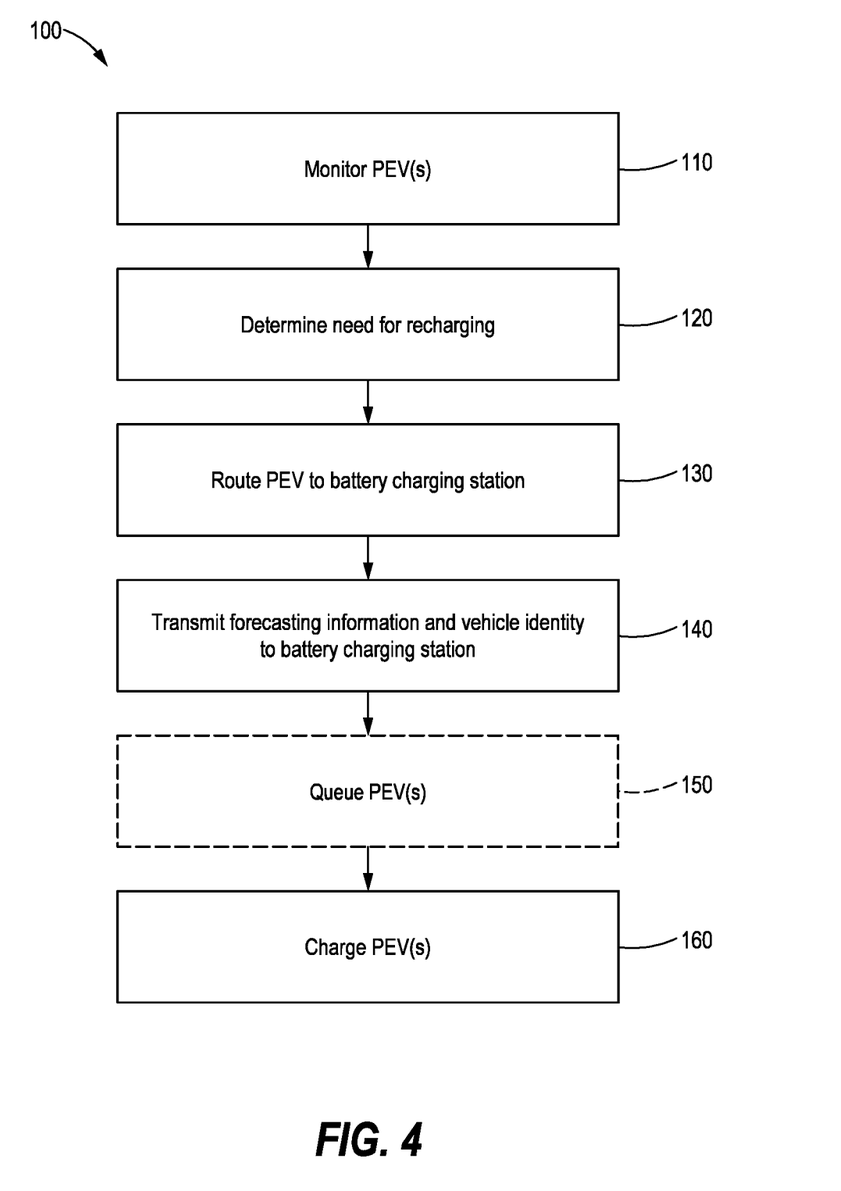
FIG. 4 is a flowchart outlining a method of managing a plurality of PEVs and at least one battery charging station according to another embodiment of the present disclosure.

Turning now to FIG. 4, a method of managing a plurality of PEVs and at least one battery charging station is generally referred to by a reference numeral 100. In some embodiments of the present disclosure, the method 100 may be performed by the fleet management server, which monitors the plurality of PEVs, routes the PEVs toward the battery charging station, and forecasts the arrival of each vehicle to the charging station.

The method 100 may first comprise monitoring one or more characterising parameters of each of the plurality of PEVs, including, for example, a battery pack SoC, DoD, or SoH (block 110). In block 120, it may be determined that the PEV needs recharging, for example, if the PEV is low on power or if additional power is deemed necessary for a planned operation. The determination may be reached by automatic or programmatic means, such as through the PEV or fleet management server's software systems; or it may be decided by an operator.

Regardless, in block 130, the PEV may be routed to the battery charging station. More specifically, the fleet management server may monitor a position of the PEV via the positioning module, and may derive and transmit navigation information to the PEV based on common techniques in the art. In some embodiments, the fleet management server may calculate an efficient route to the battery charging station based on at least one of travel distance, travel time, and/or travel hazards.

In block 140, the fleet management server may transmit forecasting information to the battery charging station anticipating the arrival of the PEV. The forecasting information may disclose information such as an ETA or distance to destination. Moreover, the charging station may transmit an identity of the PEV to the charging station, which can disclose a type, make, model, and/or serial of the incoming vehicle. In many embodiments, the vehicle's identity further informs the charging station of a vehicle inlet type, inlet placement and orientation, voltage output and current type, and other charging requirements. Thereafter, the PEV may arrive at and be charged at the battery charging station (block 160).

In some embodiments of the present disclosure, each PEV may be charged at more than one battery charging station, so long as the corresponding connector and proper infrastructure is available therein. In such cases, block 130 may further comprise determining which of the plurality of battery charging stations to route the PEV. In some embodiments, the determination of destination may be based on at least one of the following factors: travel distance, travel time, travel hazards, and station availability.

And in other embodiments, the fleet management server may need to queue one or more PEVs for charging at the same battery charging station. In such cases, the method 100 may further comprise queueing the vehicles based on at least one of the following factors: ETA, the operation schedule of each vehicle, and the vehicle inlet type of each vehicle (block 150). However, no limitation herein is intended for the algorithms and methods controlling either the routing process or the queueing process.

Figure 5:
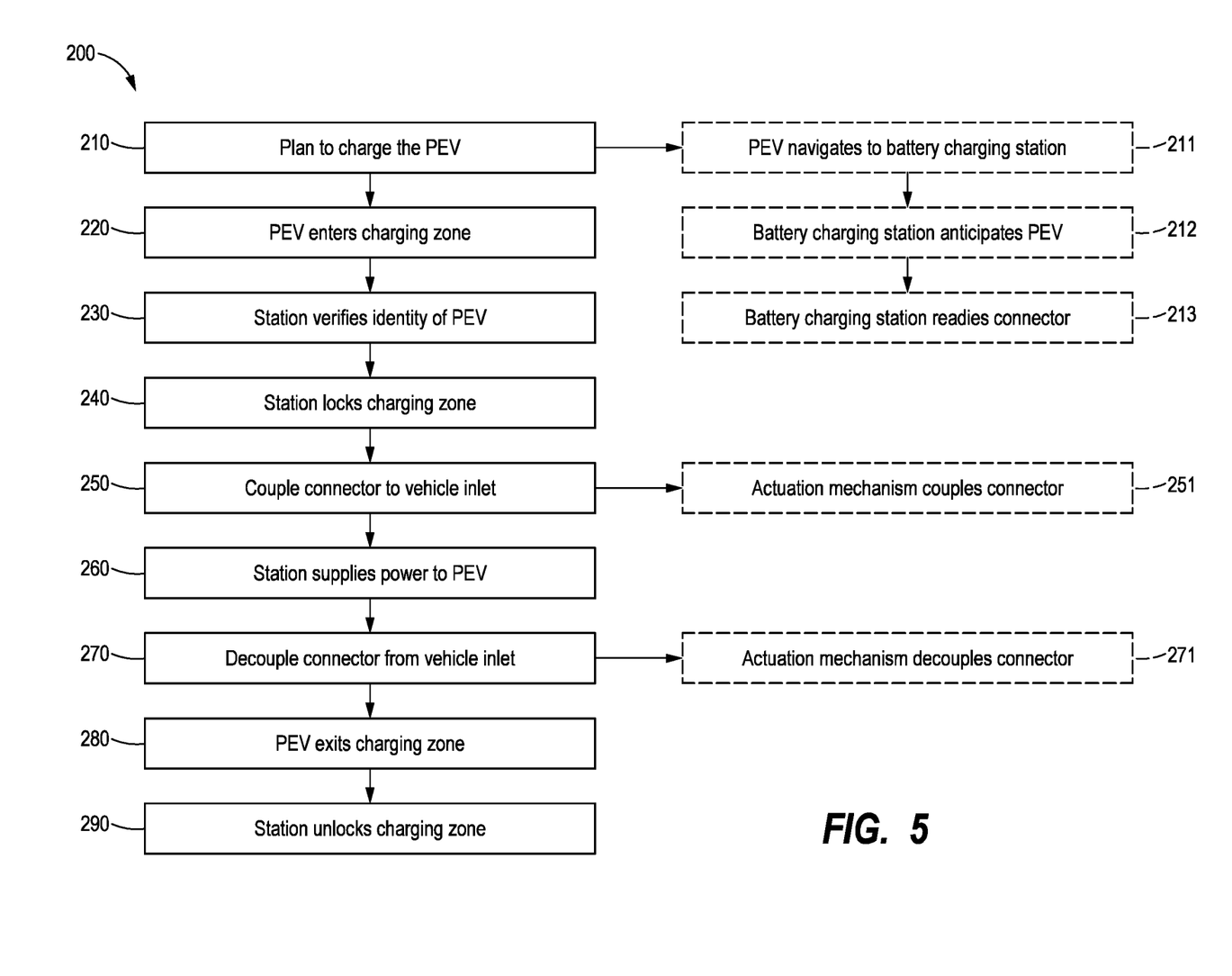
FIG. 5 is a flowchart outlining a method of charging a PEV at a battery charging station according to another embodiment of the present disclosure.
Figure 6:
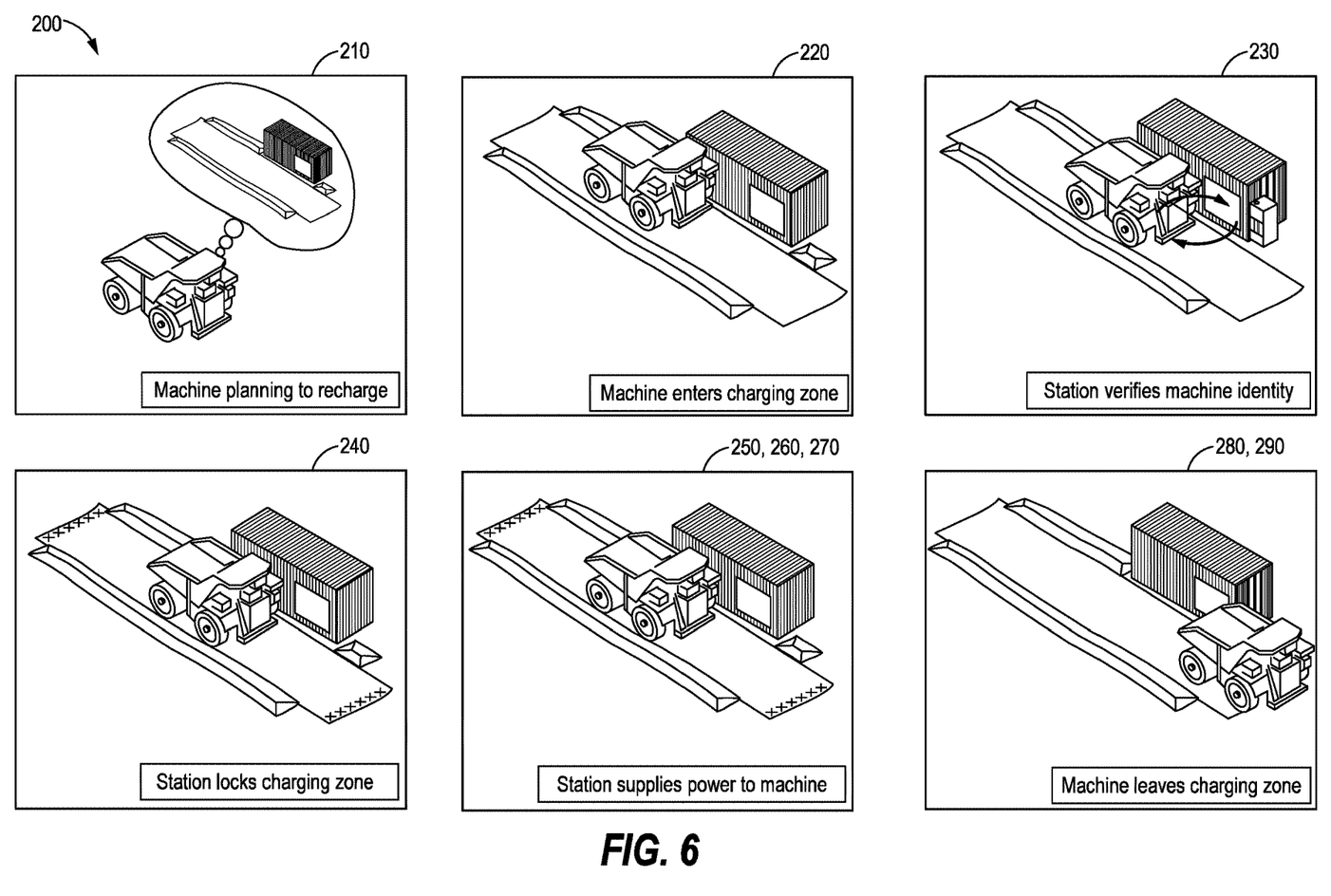
FIG. 6 is a flowchart illustrating the method outlined in FIG. 5.

Turning now to FIG. 5 and FIG. 6, a method of charging a PEV at a battery charging station is generally referred to by a reference numeral 200. FIG. 5 is a flowchart outlining the steps of the method 200, while FIG. 6 graphically represents several key steps therein. In block 210, a PEV plans to charge its rechargeable battery pack at a battery charging station. In some embodiments, the planning step may further include the PEV navigating to the battery charging station (block 211), the battery charging station anticipating an arrival of the PEV (block 212), and the battery charging station readying a corresponding connector (block 213), each step of which may occur in a different order and/or concurrently.

Next, the PEV enters a charging zone of the battery charging station (block 220), whereupon the charging station verifies an identity of the PEV (block 230). In some embodiments, the verification process may be performed by a local verification module, which can employ a number of identification and/or verification technologies, such as RFID, barcode scanning, Bluetooth pairing, Wi-Fi handshake, etc. In some embodiments the identity of the vehicle 10 may thus be transmitted twice, once through the forecasting information and confirmed through local verification.

In block 240, the battery charging station may lock the charging zone after verifying the identity of the PEV, such that no additional vehicles can enter (block 240).

In block 250, the corresponding connector is coupled to a vehicle inlet of the PEV. In various embodiments, the coupling may be performed manually by an operator, automatically by an actuation mechanism without manual effort (block 251), or semi-automatically through a combination of the actuation mechanism and the operator. For example, the battery charging station may employ a robotic arm to align and couple the corresponding connector with the vehicle inlet. Thereafter, in block 260, the battery charging station supplies power to the PEV.

Next, the corresponding connector is decoupled from the vehicle inlet of the PEV (block 270). In various embodiments, the decoupling may be performed manually by an operator, automatically by an actuation mechanism without manual effort (block 271), or semi-automatically through a combination of the above.

In block 280, the PEV exits the charging zone and the battery charging station. In those embodiments where the charging zone is locked, the charging zone may be unlocked after the PEV exits, such that another vehicle can now enter (block 290).

Finally, in some embodiments of the present disclosure, the actuation mechanism may further adjust a position and an orientation of the corresponding connector, which may or may not occur before the vehicle arrives at the station. And in other embodiments, the battery charging station may adjust an output voltage and a current type of the power source, which may occur before or after the vehicle arrives at the charging station.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

The invention claimed is:

1. A system for charging a plug-in electric vehicle (PEV) comprising:
   a PEV including:
      a frame;
      a locomotive device;
      a rechargeable battery pack;
      a vehicle inlet;
      a positioning module; and
      a first communication module;
   a battery charging station including:
      a plurality of connectors, each connector configured to charge a different vehicle inlet type;
      an actuation mechanism configured to ready a connector for charging; and
      a second communication module;
   wherein the PEV and the battery charging station are in operative communication; and
   wherein, prior to arrival of the PEV at the battery charging station, the battery charging station anticipates an arrival of the PEV and actuates the actuation mechanism to ready the connector corresponding to the PEV's vehicle inlet type for charging the PEV.

2. The system according to claim 1, the battery charging station further including:
   a charging zone; and
   a local verification module configured to verify an identity of the PEV when the PEV enters the charging zone.

3. The system according to claim 1, wherein the battery charging station is configured to adjust, for each of the plurality of connectors, an output voltage, an output current, a current type, a connector position, and a connector orientation.

4. The system according to claim 3, wherein the actuation mechanism is configured to automatically couple the connector to the vehicle inlet.

5. The system according to claim 1, further comprising a fleet management server in communication with the PEV and the battery charging station.

6. The system according to claim 5, the PEV further comprising:
   a plurality of sensors that measure a battery pack voltage, current, and temperature;
   wherein the fleet management server receives and monitors a battery pack state of charge (SoC) or depth of discharge (DoD) of the PEV.

7. The system according to claim 5, wherein the fleet management server receives and monitors a position of the PEV, calculates and transmits navigation information to the PEV routing the PEV to the battery charging station, and transmits forecasting information and an identity of the PEV to the battery charging station.

8. The system according to claim 7, further comprising a plurality of battery charging stations, each in communication with the fleet management server and in operative communication with the PEV;
   wherein the fleet management server routes the PEV to one of the plurality of battery charging stations based on at least one of the following factors: travel distance, travel time, travel hazards, and station availability.

9. The system according to claim 5, further comprising a plurality of PEVs, each in communication with the fleet management server and in operative communication with the battery charging station;
   wherein the fleet management server receives and monitors a battery pack state of charge (SoC) or depth of discharge (DoD) and a position of each PEV.

10. The system according to claim 1, wherein the PEV is a work machine employed in a resource industry.

11. The system according to claim 1, wherein the battery charging station is a mobile charging station.

12. A method of managing a plurality of plug-in electric vehicles (PEVs) and at least one battery charging station, comprising the steps of:
   monitoring one or more characterising parameters of each of the plurality of PEVs;
   determining that a PEV from among the plurality of PEVs needs charging;
   routing the PEV to the battery charging station;
   transmitting forecasting information and an identity of the PEV to the battery charging station;
   prior to arrival of the PEV at the battery charging station, actuating an actuation mechanism of the battery charging station to ready a connector for charging the PEV corresponding to a vehicle inlet type of the PEV; and
   charging the PEV at the battery charging station after arrival at the battery charging station.

13. The method of managing according to claim 12, wherein the step of routing the PEV further includes:
   monitoring a position of the PEV; and
   calculating a route to the battery charging station based on at least one of the following factors: travel distance, travel time, and travel hazards.

14. The method of managing according to claim 13, wherein the step of determining further includes:
   determining which of a plurality of battery charging stations to route the PEV to based on at least one of the following factors: travel distance, travel time, travel hazards, and station availability.

15. The method of managing according to claim 13, further comprising the step of:
   queuing one or more PEVs for charging at the battery charging station based on at least one of the following factors: estimated time of arrival (ETA), operation schedule, and vehicle inlet type.

16. A method of charging a plug-in electric vehicle (PEV) at a battery charging station, comprising the steps of:
   planning to charge the PEV at the battery charging station, wherein the step of planning further includes:
      the PEV navigating to the battery charging station;
      the battery charging station anticipating an arrival of the PEV; and
      prior to arrival of the PEV at the battery charging station, actuating an actuation mechanism of the battery charging station to ready a corresponding connector to the PEV's vehicle inlet type for charging;
   the PEV entering a charging zone of the battery charging station;
   the battery charging station verifying an identity of the PEV;
   coupling the corresponding connector to a vehicle inlet of the PEV;
   the battery charging station supplying power to the PEV;

decoupling the corresponding connector from the vehicle inlet of the PEV; and the PEV exiting the charging zone.

17. The method according to claim 16, wherein the step of coupling further includes the actuation mechanism coupling the corresponding connector to the vehicle inlet without manual effort; and wherein the step of decoupling further includes the actuation mechanism decoupling the corresponding connector from the vehicle inlet without manual effort.

18. The method according to claim 16, further comprising:

locking the charging zone after verifying the identity of the PEV; and unlocking the charging zone after the PEV exits the charging zone.

19. The method according to claim 16, further comprising:

the actuation mechanism adjusting a position and an orientation of the corresponding connector; and the battery charging station adjusting an output voltage and a current type.

\* \* \* \* \*